Dec. 6, 1960    R. E. SANCTUARY    2,963,263
BALL VALVE SEAT RING
Filed May 21, 1958    2 Sheets-Sheet 1
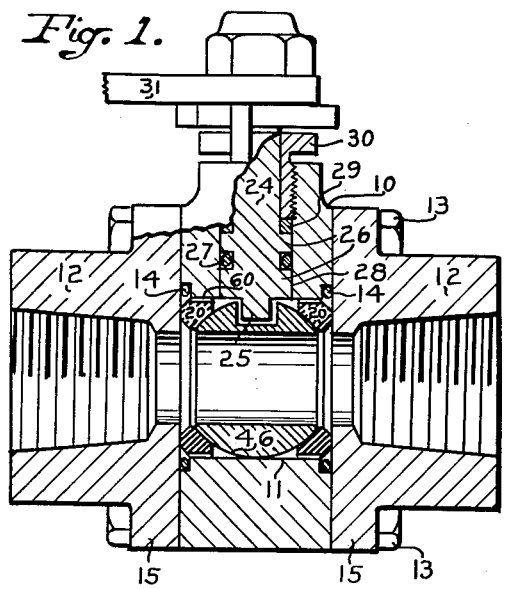
Fig. 1.
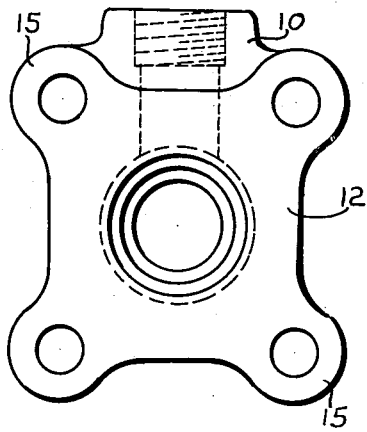
Fig. 3.
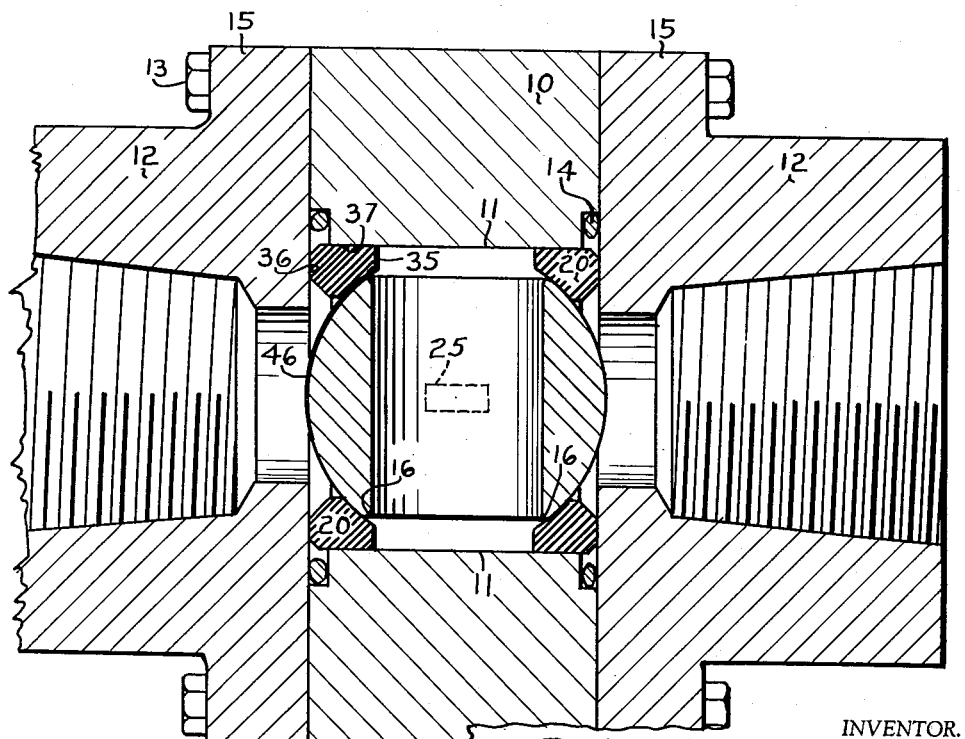
Fig. 2.
INVENTOR.
Robert E. Sanctuary
BY
ATTORNEY

United States Patent Office 2,963,263
Patented Dec. 6, 1960

2,963,263

BALL VALVE SEAT RING

Robert E. Sanctuary, Shrewsbury, Mass., assignor to Worcester Valve Co., Inc., Worcester, Mass., a corporation of Massachusetts Filed May 21, 1958, Ser. No. 736,736

1 Claim. (Cl. 251—175)

This invention relates to ball valves, and more particularly to the seat ring against which the valve is rotatably seated.

A ball valve of the general type shown in my prior patent applications Serial Number 584,024, filed May 10, 1956, now U.S. Patent No. 2,858,098, dated October 28, 1958, and Serial Number 693,717, filed October 31, 1957, comprises a substantially spherical ball rotatably mounted in a valve body between two seat rings which are shaped to form a tight seal on the downstream side of the valve and close off the flow of fluid through an adjacent valve end connected into a pipe line. The ball is mounted for floating substantially freely with the fluid pressure, so as to compress the downstream seat ring as it makes a tight fluid seal. The ball has a bore transversely therethrough forming an annular shape with rounded noses, and it is rotated by means of a valve stem loosely connected thereto, so that the hole through the ball may permit fluid to flow freely or the solid side of the ball may close the passage to the downstream valve end. According to my prior U.S. Patent No. 2,858,098, the seat ring has been made of an elastomer provided with an annular, comparatively narrow, rounded lip merging with a substantially conical portion tangent to the ball. That lip has been so shaped and arranged that when the ball nose is rotated to close the valve, the nose must force the projecting lip substance to flow laterally out of the way. However, the sealing surface of the lip is not extensive and often inadequate for optimum purposes, and particularly since the contact area is about the same for both high and low fluid pressures.

The primary object of my invention is to provide a seating ring which is so shaped relative to the ball annulus that when the ball is subjected to a low fluid pressure only sufficient ring substance is displaced to provide an adequate sealing contact of small area, but under a high fluid pressure a greater proportion of ring substance up to a maximum is displaced and the ring has a maximum of contact area engaging the ball, so as to make an effective seal at both low and high pressures.

A further object is to provide a valve construction having an elastomeric seat ring which satisfies this high and low pressure requirement and wherein the ring is so made that the ball may be turned with a minimum amount of torque at low fluid pressures. Further objects will be apparent in the following disclosure.

Referring to the drawings:

Fig. 1 is a vertical sectional view of one form of valve embodying my invention;

Fig. 2 is a horizontal section thereof;

Fig. 3 is an end view of the valve; and

Figure 4:
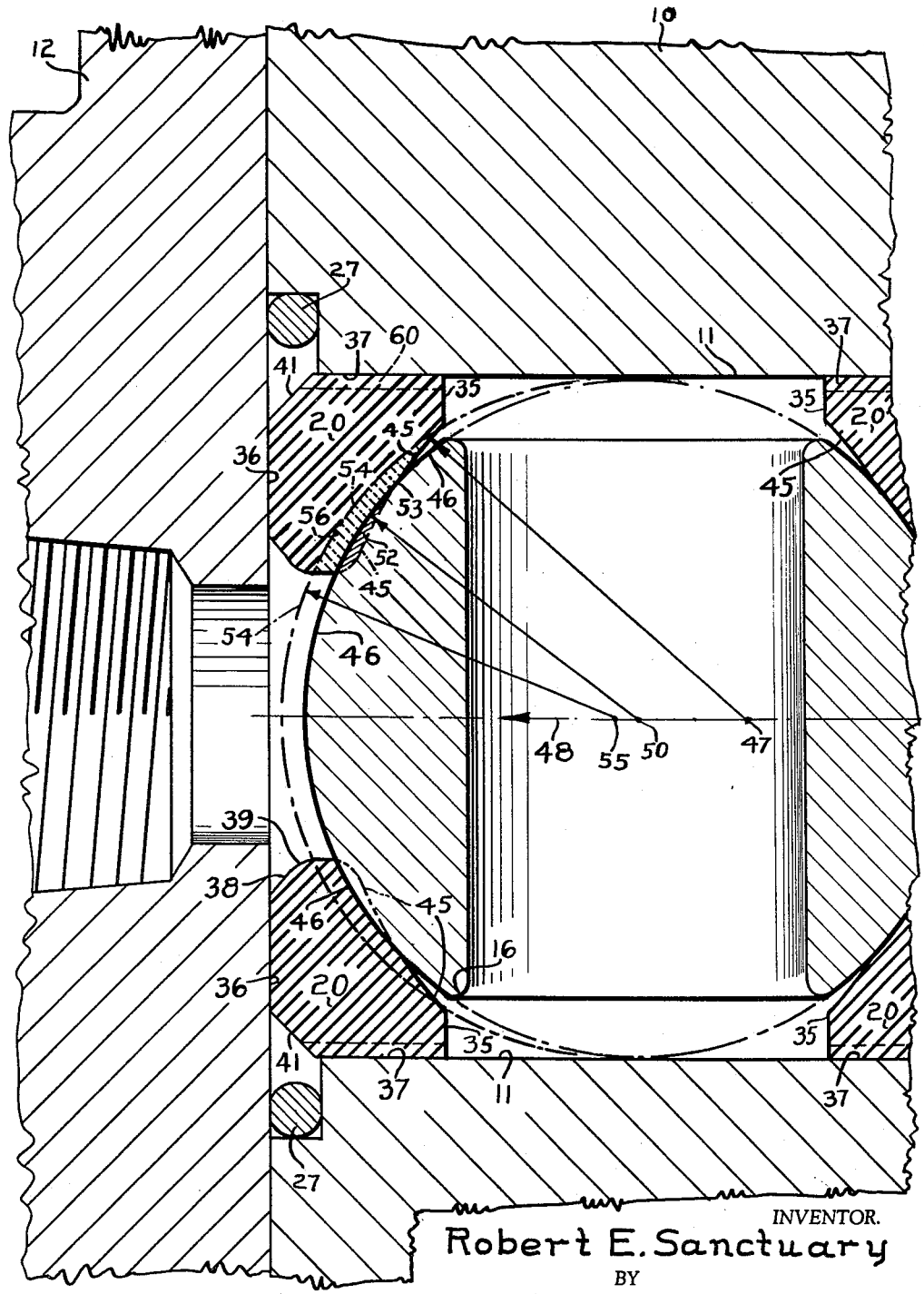
Fig. 4 is an enlarged diagrammatic and fragmentary horizontal sectional view, corresponding with Fig. 2, which illustrates the principles of the valve operation.

Referring first to the major features of a suitable ball valve construction, the valve illustrated may comprise a one-piece metal body 10 having a horizontal bore therethrough providing an inner cylindrical surface 11. Suitable and preferably removable valve ends 12 of desired shape are secured on opposite sides of the valve body by cap screws or preferably bolts 13, and adequate O-rings 14 of suitable elastomeric material are provided therebetween to effect a desired seal. Each valve end 12 may comprise a fitting having a substantially rectangular flange provided with ears 15, as shown in Fig. 3, through which the bolts 13 are passed, and these may be arranged outside of the body 10 to hold the two opposite fittings tightly clamped thereagainst.

The ball is annular in shape because of the substantially cylindrical bore therethrough, and each nose portion 16 at the opposite sides of the annular body is provided with a rounded surface of a small radius to insure ease of turning the ball relative to its seat rings. The ball is mounted for free movement between two annual seat rings 20 which have outer cylindrical peripheries fitting within the cylindrical bore 11 of the valve body and are held in place by the inner parallel faces of the end fittings 12. The ball is turned by means of a valve stem 24 which has a rectangular lug 25 loosely interfitting with a slot cut in the top of the ball, as shown in the drawing, which provides for the ball movement downstream with the fluid pressure. The valve stem has enlarged flanges 26 separated by a groove carrying an elastomeric O-ring 27 which serves as a seal to prevent the flow of fluid between the external cylindrical surface of the valve stem and an inner cylindrical face 28 bored vertically or at right angles to the fluid passage of the valve body. A washer 29 above the upper flange is engaged by the inner end of a bonnet 30 threaded into the cylindrical vertical bore of the body. This holds the valve stem removably in place. The valve stem is rotated by means of a stem handle 31 suitably mounted on the end of the stem, as is understood. The ball and rings may be assembled or replaced by removing the bolts 13 which hold the end fittings on the body, and if necessary, by screwing the bonnet 30 upwardly to free the valve stem from the ball. Then the ball and its rings may be assembled through either side opening, with the rings under a low compression. Various features inherent in ball valves of my prior cases or as desired may be incorporated in this construction.

The primary feature of my invention pertains to the construction of the elastomeric seat ring 20. If desired, only one seat ring may be employed on the downstream side of a one way valve, and a suitable brass or other type of ring may be located on the upstream side. However, the valve is illustrated as intended for a two-way fluid flow and the seat rings are made symmetrical and duplicate in structure.

Referring now to Fig. 4, I have there illustrated diagrammatically the principles underlying this invention. Each seat ring 20 in its preferred form has two suitable and preferably parallel flat front and rear faces 35 and 36, an outer cylindrical face 37 which is adapted to fit within the cylindrically shaped body opening 11, and a substantially conical face 38 merging with a rounded inner nose portion 39 which form the fluid passage through the ring and communicating with the adjacent passage through the end fitting. A conical face 41 is located between the cylindrical periphery 37 and the flat or plane face 36 which forms the rear of the seat ring and lies in contact with the end fitting. The space between the conical faces 38 and 41 and the inner face of the valve end provide room for distortion of the seat ring under pressure.

This invention pertains primarily to the inner face 45 of the seat ring which seats against the outer part spherical surface portion 46 of the ball annulus 20. The seat ring surface 45 is shaped as a zone of a sphere. Its non-assembled position of no-fluid pressure is indicated by the full and dotted portions of line 45 which defines a zonal surface having for the center of its imaginary sphere the point 47 which is located on the center line 48 of the fluid passage through the ball and the fittings. As will be appreciated, this surface may vary somewhat from a sphere without departing from the scope of this invention. When the spherical surface 46 of the ball annulus is assembled against the two seat rings, the center of the ball is located at the point 50 on the center line 48 and halfway between the seat rings. The initial assembly position of the ball is such that the ball displaces a portion of the seat ring as indicated by the cross hatching 52 at the upper part of the figure. Although the seat ring displacement depends on the ball pressure, the ball is shown as contacting with only about one-half of the available seat ring surface, as indicated by the point 53 of intersection of the lines 45 and 46 defining ring and ball surfaces. That is, when the ball and the two seat rings are assembled in the valve body and the bolts 13 are tightened to seat the valve end fittings against the valve body 10, this causes the ball to compress the two rings equally and displace the ring portions 52. The result is a plastic flow of the elastomeric substance of the rings into the available space, and thus the initial displacement, as shown by the cross hatching 52, insures that the non-concentric ball and ring contact completely throughout a substantial area of the ring, and the valve seal is adequate for a low pressure fluid. Under this low pressure condition, the valve ball may be easily turned, since the turning moment does not require that the ball displace any further volume of ring substance.

The ball is mounted for a floating movement downstream; hence, as the fluid pressure is increased, the ball moves towards the left (Fig. 4) with a displacement of further ring substance, until the ball makes a maximum surface contact with the ring, as is shown by the dotted line 54 and the new ball center 55. This supplemental displacement is indicated by the cross hatching 56. As the fluid pressure increases still more, the full contact of ball and ring is maintained and the ring substance flows still more into the outer spaces. At the same time, the ball center moves away from the upstream ring and relieves the compressive displacement of that ring.

Thus, the area of contact of the ball and the downstream seat ring varies with the fluid pressure, so that this contact is minimum but adequate for a low pressure, and it provides a maximum contact when needed to hold the highest pressure to which the valve is to be subjected. Thus, under low pressure it is comparatively easy to turn the ball against the frictional opposition of the contacting ring substance, since the displaced ring substance is minimum. It will be appreciated that the ring on the upstream side of the ball assumes positions the reverse of these indicated for the downstream side, since the ball has moved away from the upstream seat ring to a position where contact with the ring may be at a minimum.

In order to satisfy the above requirements relative to displacement of the ring substance, I prefer that the ring be made of an elastomer such as vulcanized rubber, nylon or rubber hydrochloride or other synthetic polymer which is capable of both flowing under a high pressure displacement, as above set forth, and of presenting an adequate opposition to fluid flow and providing a sealing of long life and durability. A suitable commercial product, known as Teflon, the Du Pont trademark for a tetrafluoroethylene resin, is found particularly satisfactory for use as a seat ring under both low and high pressures.

If the downstream elastic seat ring were conical and initially tangent to the ball at a line of contact, it would take an increasingly greater pressure to force the spherical ball into the ring substance to increase the area of contact even to a small extent and provide a suitable support for the ball. If the ring and ball contact surfaces were spherical zones having the same radii of curvature and contact throughout a maximum width of zone for all pressures, the attendant friction would hamper turning the ball at the low as well as the high pressures. In accordance with this invention, the seat ring contact surface is a spherical zone having a radius a little greater than that of the ball and this differential in radii is calculated, with relation to the elasticity of the ring substance, to provide an adequate ball support at all times. That is, the zone radius is such that under the normal pressure of assembly of the rings and ball in the valve body, the ring substance will be caused to flow and provide a width of zonal contact sufficient to support the ball against excessive downstream movement when the fluid pressure is applied. As the fluid pressure increases, the area of contact with the ring zone increases and preferably to nearly the maximum by the time the fluid pressure has reached the normal maximum for which the valve is adapted. Thus, the contact zone area is progressively increased to give increased support to the ball as pressure on the valve is increased. As shown in Fig. 4, a desirable difference in the lengths of the radii of the ring zone and the ball is less than half of the ball radius, but this will vary according to the type of elastomer used as well as the valve requirements.

The rings are shown as provided with small grooves on their peripheries, indicated by the line 60 in Fig. 4, which provide for a transfer of fluid pressure from one side of the seat ring to the other, as is described and claimed in my prior application Serial #693,717. This equalization of fluid pressure makes it easier to turn the valve when subjected to a high pressure on the upstream side. That is, the pressure on the upstream seat ring is relieved and transferred to the downstream seat ring. The ball is sealed tightly against that downstream ring and the ring itself is forced tightly against the inner flange face of the end fitting so that all leakage of fluid is prevented. This serves to eliminate the pressure differential between the up- and downstream sides of the upstream ring, so that the upstream seat ring floats substantially freely relative to the valve ball. Hence, this pressure equalization passage makes it possible to turn the ball from a closed to an open position under a high fluid pressure.

It will now be seen, in view of the above description, that I have provided a valve having an annular ball plug and a seat ring whose effective sealing action is provided by a part spherical surface of a larger radius than that of the ball to satisfy the above specified requirements. The downstream side of the ball is arranged to be seated against the surface of a seat ring of elastomeric material, and preferably two seat rings are mounted on diametrically opposed portions of the ball. The effective sealing face of the seat ring is a zonal portion of a spherical shape whose diameter is greater than that of the ball. The centers of each seat ring and the ball are preferably located on the center line of the fluid passage therethrough, with the center of the ball located between the center of the seat ring and the effective seat ring face at each side of the ball. The ball compressively engages the zonal face of the seat ring, and in the usual assembly of the ball between two rings the center of the ball is half way between the engaged faces of the two rings. That is, the ball is assembled between the seat rings with sufficient compression of the latter to displace some of the ring substance into available spaces, so that the ball makes an uninterrupted contact with a continuous surface portion of only a part of the available zone surface of the ring. That contact area may vary widely, depending on the ring substance and the fluid pressure.

Under an increasing fluid pressure, the freely movable ball moves toward the downstream seat ring and displaces an increasingly greater volume of the ring substance as the fluid pressure increases, so that the ball may ultimately contact the entire zonal surface of the seat ring at the maximum permitted fluid pressure. Hence, under low pressure or assembly conditions, the ball has only a small contact area against the seat ring with a corresponding ease of rotation of the ball relative thereto. As the fluid pressure increases and there is need for a greater contact of the ball and seat ring, the ball moves downstream under that fluid pressure to displace an increasingly greater ring substance and thereby provide an increasingly greater sealing and contact area between the two parts. This construction is such that when the ball is turned, its rounded nose has somewhat of a camming effect in displacing the ring substance gradually. Hence, the opposition to the turning torque of the ball is such that the valve may be opened and closed with comparative ease and particularly when under low pressure.

It will be appreciated that various valve constructions may be employed with this new form of seat ring and that the above disclosure is intended to set forth the principles of the invention and a preferred embodiment and not as imposing limitations on the appended claim.

I claim:

A valve comprising a hollow casing providing a peripheral wall and opposed annular seat ring supporting surfaces, annular seat rings shaped to fit against both said wall and said surfaces and provide a central fluid passage, an annular fluid controlling valve ball rotatably mounted between the rings which has opposed ring engaging noses merging with spherical zonal seat ring engaging surfaces, and means including a stem engaging the ball which serves to turn the ball between open and closed positions and provides for a limited downstream movement of the ball, each ring being a unitary annulus of distortable elastomeric substance having a peripheral face fitting against said wall, an end surface seating against a ring supporting surface of the casing, a ball engaging face initially shaped as a concave spherical zonal surface and a face adjacent the fluid passage which merges with the concave face and cams the ball nose thereon, said spherical zonal surface having its center located substantially on the center line of the fluid passage of the ring and a radius materially greater than that of the ball so that said ring substance is progressively distorted as the ball moves downstream under an increasing fluid pressure from an initial contact of the ball with only a portion of the concave surface of the downstream ring adjacent the fluid passage to a maximum surface contact with the ring concave surface, the initial difference at assembly between the ring and ball radii being materially less than the ball radius and providing only a limited small movement of the ball before it reaches a maximum contact with the entire concave surface of the ring.

References Cited in the file of this patent

UNITED STATES PATENTS

| | | |
|---|---|---|
| 2,765,142 | Ludeman | Oct. 2, 1956 |
| 2,792,196 | Clade | May 14, 1957 |
| 2,809,011 | Davis | Oct. 8, 1957 |
| 2,855,177 | Freeman | Oct. 7, 1958 |

FOREIGN PATENTS

| | | |
|---|---|---|
| 149,684 | Australia | Jan. 19, 1953 |
| 759,218 | Great Britain | Oct. 17, 1956 |